US012500706B2

(12) United States Patent
Chandrasekar et al.

(10) Patent No.: US 12,500,706 B2
(45) Date of Patent: Dec. 16, 2025

(54) PHYSICAL (PHY) LAYER COMMUNICATIONS

(71) Applicant: QUALCOMM Incorporated, San Diego, CA (US)

(72) Inventors: Manikandan Chandrasekar, Bangalore (IN); Raj Kumar Krishna Kumar, Bangalore (IN); Venkatesh Bhat, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 497 days.

(21) Appl. No.: 17/818,693

(22) Filed: Aug. 9, 2022

(65) Prior Publication Data

US 2024/0056238 A1 Feb. 15, 2024

(51) Int. Cl.
*H04W 4/00* (2018.01)
*H04L 5/00* (2006.01)
*H04W 72/0453* (2023.01)

(52) U.S. Cl.
CPC .......... *H04L 5/0007* (2013.01); *H04L 5/0094* (2013.01); *H04W 72/0453* (2013.01)

(58) Field of Classification Search
CPC ............... H04L 5/0007; H04L 5/0049; H04W 72/0453; H04W 72/0446
See application file for complete search history.

(56) References Cited

U.S. PATENT DOCUMENTS

| | | | |
|---|---|---|---|
| 10,348,469 B2 | 7/2019 | Azizi et al. | |
| 2015/0195730 A1* | 7/2015 | Siomina | H04W 24/10 370/252 |
| 2016/0057754 A1* | 2/2016 | Azizi | H04L 5/0023 370/329 |
| 2019/0253296 A1 | 8/2019 | Chen et al. | |
| 2022/0159555 A1* | 5/2022 | Cariou | H04W 48/12 |
| 2023/0333193 A1* | 10/2023 | Loren | G01S 5/021 |

FOREIGN PATENT DOCUMENTS

| | | |
|---|---|---|
| EP | 3183835 B1 | 1/2021 |
| WO | 2023204949 A1 | 10/2023 |
| WO | 2023225440 A1 | 11/2023 |

OTHER PUBLICATIONS

International Search Report and Written Opinion—PCT/US2023/070068—ISA/EPO—Jan. 29, 2024.
Partial International Search Report—PCT/US2023/070068—ISA/EPO—Oct. 18, 2023.

* cited by examiner

*Primary Examiner* — Abdelnabi O Musa
(74) *Attorney, Agent, or Firm* — ArentFox Schiff LLP

(57) ABSTRACT

This disclosure provides methods, devices and systems for communicating over a 60 GHz band and reusing legacy hardware for communication over sub-6 bands. Certain aspects are directed to outputting, for transmission to a second wireless device, a first packet, wherein the first packet is output via a radio frequency (RF) front end defined by a first clock accuracy requirement having an acceptable error rate that is lower than a legacy clock accuracy requirement, and wherein the first packet is output for transmission via a first band. Certain aspects are directed to obtaining, from the second wireless device, a second packet via the first band.

15 Claims, 9 Drawing Sheets

PHYSICAL (PHY) LAYER COMMUNICATIONS

TECHNICAL FIELD

This disclosure relates generally to wireless communication, and more specifically, addressing techniques for physical (PHY) layer communications in a 60 GHz band.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN. Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

IEEE 802.11ad is directed to a wireless physical (PHY) layer that operates over a 60 GHz millimeter (mm) wave frequency band, and provides for data rates of 7 Gigabits per second (Gbps). Communication (e.g., signal transmission and reception) in the 60 GHz band is quite different from that of the three traditional bands (e.g., 2.4 GHz band, 5 GHz band, and 6 GHz band) due to, among others, bandwidth differences and coding rates. These differences may affect both manufacturing, design, and costs of wireless devices.

SUMMARY

The systems, methods and devices of this disclosure each have several innovative aspects, no single one of which is solely responsible for the desirable attributes disclosed herein.

Certain aspects are directed to an apparatus configured for wireless communication. The apparatus includes a memory comprising instructions and one or more processors configured to execute the instructions. In some examples, the one or more processors are configured to output, for transmission to a wireless device, a first packet, wherein the first packet is output via a radio frequency (RF) front end defined by a first clock accuracy requirement having an acceptable error rate that is lower than a legacy clock accuracy requirement, and wherein the first packet is output for transmission via a first band. In some examples, the one or more processors are configured to obtain, from the wireless device, a second packet via the first band.

Certain aspects are directed to an apparatus configured for wireless communication. The apparatus includes a memory comprising instructions and one or more processors configured to execute the instructions. In some examples, the one or more processors are configured to output, for transmission via a first band to a wireless device, a first packet comprising a first preamble portion and a first data portion, wherein at least the first preamble portion was upclocked by a first factor relative to a legacy band. In some examples, the one or more processors are configured to obtain, from the wireless device via the first band, a second packet comprising a second preamble portion and a second data portion, wherein at least the second preamble portion of the second packet was upclocked by the first factor relative to the legacy band.

Certain aspects are directed to a method for wireless communication by a first wireless device. In some examples, the method includes outputting, for transmission to a second wireless device, a first packet, wherein the first packet is output via a radio frequency (RF) front end defined by a first clock accuracy requirement having an acceptable error rate that is lower than a legacy clock accuracy requirement, and wherein the first packet is output for transmission via a first band. In some examples, the method includes obtaining, from the second wireless device, a second packet via the first band.

Certain aspects are directed to a method for wireless communication by a first wireless device. In some examples, the method includes outputting, for transmission via a first band to a wireless device, a first packet comprising a first preamble portion and a first data portion, wherein at least the first preamble portion was upclocked by a first factor relative to a legacy band. In some examples, the method includes obtaining, from the wireless device via the first band, a second packet comprising a second preamble portion and a second data portion, wherein at least the second preamble portion of the second packet was upclocked by the first factor relative to the legacy band.

Certain aspects are directed to a first wireless device. In some examples, the first wireless device includes a means for outputting, for transmission to a second wireless device, a first packet, wherein the first packet is output via a radio frequency (RF) front end defined by a first clock accuracy requirement having an acceptable error rate that is lower than a legacy clock accuracy requirement, and wherein the first packet is output for transmission via a first band. In some examples, the first wireless device includes a means for obtaining, from the second wireless device, a second packet via the first band.

Certain aspects are directed to a first wireless device. In some examples, the first wireless device includes a means for outputting, for transmission via a first band to a wireless device, a first packet comprising a first preamble portion and a first data portion, wherein at least the first preamble portion was upclocked by a first factor relative to a legacy band. In some examples, the first wireless device includes a means for obtaining, from the wireless device via the first band, a second packet comprising a second preamble portion and a second data portion, wherein at least the second preamble portion of the second packet was upclocked by the first factor relative to the legacy band.

Certain aspects are directed to an apparatus for wireless communications, wherein the apparatus includes a memory comprising instructions and one or more processors configured to execute the instructions. In some examples, the one or more processors are configured to output, for transmission to a second wireless device, a first packet, wherein the first packet is output via a radio frequency (RF) front end defined by a first clock accuracy requirement having an acceptable error rate that is lower than a legacy clock accuracy requirement, and wherein the first packet is output for transmission via a first band. In some examples, the one or more processors are configured to obtain, from the second wireless device, a second packet via the first band.

Certain aspects are directed to an apparatus for wireless communications, wherein the apparatus includes a memory comprising instructions and one or more processors configured to execute the instructions. In some examples, the one or more processors are configured to output, for transmission via a first band to a wireless device, a first packet comprising a first preamble portion and a first data portion, wherein at least the first preamble portion was upclocked by a first factor relative to a legacy band. In some examples, the one or more processors are configured to obtain, from the wireless device via the first band, a second packet comprising a second preamble portion and a second data portion, wherein at least the second preamble portion of the second packet was upclocked by the first factor relative to the legacy band

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
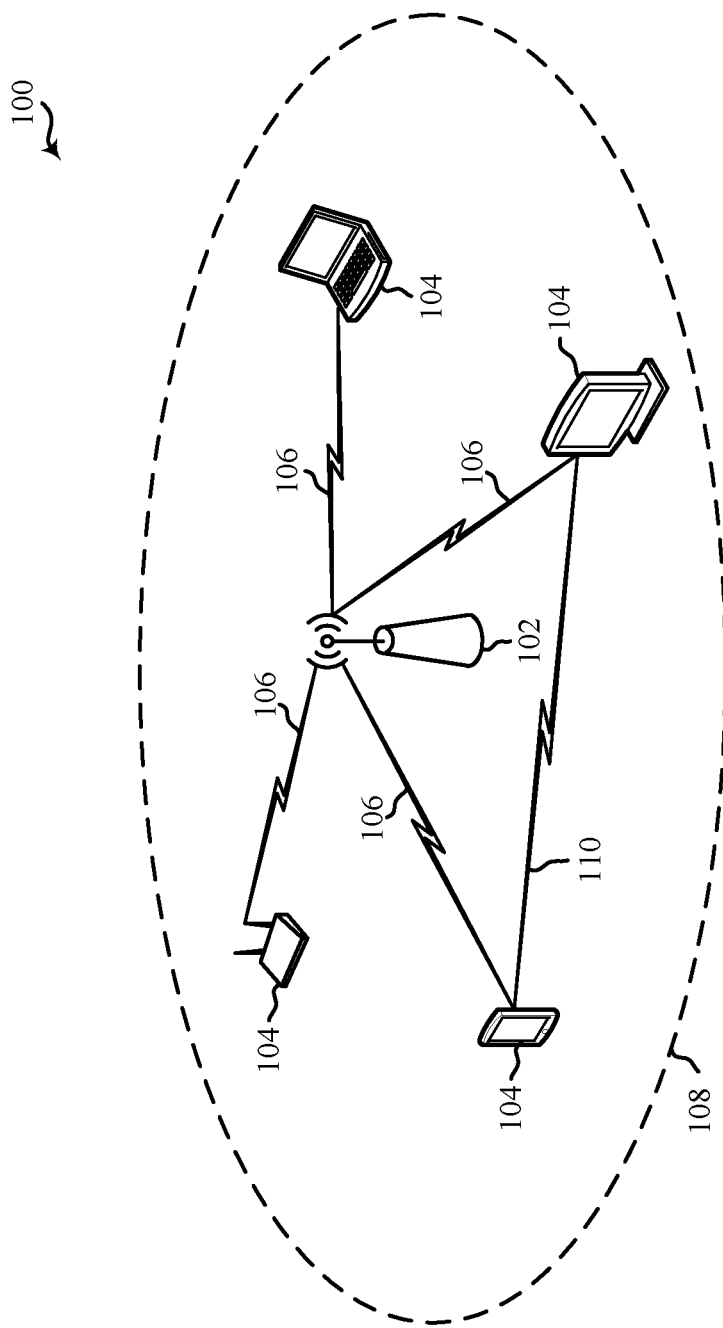
FIG. 1 is a pictorial diagram illustrating an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the $3^{rd}$ Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Conventional Wi-Fi primarily operates on three traditional bands: a 2.4 gigahertz band, a 5 gigahertz band, and recently a 6 gigahertz band. However, Wi-Fi standards 802.11ad and 802.11ay introduced Wi-Fi operations on a 60 gigahertz band. The 60 gigahertz band uses an air interface and a physical layer air interface that is quite different from that of the three traditional bands. For example, a maximum bandwidth used by the three traditional bands is 320 megahertz, whereas a minimum bandwidth used to operate in the 60 gigahertz band is 2 gigahertz. As such, the traditional bands and the 60 gigahertz band have some rather significant bandwidth and waveform differences. Accordingly, Wi-Fi hardware to support the 60 gigahertz band is often different and in addition to hardware that supports the traditional bands, resulting in higher bill of material costs.

Thus, aspects of the disclosure are directed to methods and techniques for communicating using similar waveforms and bandwidths for both the traditional bands and the 60 gigahertz band. In other words, aspects are directed to a physical layer air interface design for use with both conventional Wi-Fi bands and the 60 GHz band. Such operations may significantly reduce the cost of Wi-Fi hardware that supports the traditional bands and the 60 gigahertz band, as well as expand operations of legacy Wi-Fi equipment to the 60 GHz band. Such operations may also reduce traffic congestion over the traditional bands by utilizing the 60 GHz band, which includes about around 14 gigahertz of usable spectrum. This may improve both traffic throughput and communication latencies.

As discussed, operation of the 60 GHz band in Wi-Fi may require channels approximately 2 GHz wide. Thus, according to standards 802.11ad and 802.11 ay, each channel of the 60 GHz band may operate on a bandwidth of 2 GHz, whereas the three traditional bands may use a channel spacing of approximately 320 MHz. In certain aspects, legacy hardware and current hardware that support the three traditional bands may be leveraged to also support 60 GHz communications even if the channel bandwidth remains 320 MHz. Thus, aspects are directed to using 320 MHz channelization for communications via both the 60 GHz band as well as the traditional bands. While 320 MHz channelization may be used, other channelization (e.g., 160 MHz, 80 MHz, 40 MHz, 20 MHz, etc.) is also contemplated. In certain aspects, 60 GHz communications made use the same modulation and coding schemes used by the traditional bands, and/or the same OFDM waveform used by the traditional bands.

One of the key challenges of Wi-Fi communications is related to carrier frequency offset (CFO). For example, a wireless device may communicate using a certain carrier frequency associated with a Wi-Fi channel. The device may include a local oscillator configured to tune the carrier frequency in order to transmit and receive wireless signaling over the channel associated with the carrier frequency. For example, if the carrier frequency is 2.5 GHz, then the device may use the local oscillator to tune the RF front end to 2.5 GHz. However, the local oscillator may not tune to exactly 2.5 GHz. That is, the local oscillator may deviate slightly from 2.5 GHz. Thus, the Wi-Fi standards define a requirement for CFO that allows the device to deviate slightly from 2.5 GHz. For example, standards may require a CFO accuracy that requires local oscillators to not deviate by more than ±20 parts per million (PPM) from the intended carrier frequency. In other words, if a device locks on to a particular carrier frequency, the device shall not deviate from that frequency by more than 20 PPM in the negative and positive direction.

A physical layer (e.g., a physical layer protocol data unit (PPDU)) waveform may include one or more preamble and data fields. In some examples, the preambles include sequences configured to indicate whether the transmitting device has data intended for a particular receiving device. Accordingly, the receiving device may listen to the preamble signals over the air, and if a preamble sequence matches the receiving device's own sequence, then the receiving device may expect to receive data in a subsequent data field of the PPDU.

Referring to operation over the traditional bands, if there is CFO on both the transmitter and receiver sides, there is potential for aggregate CFO to be as high as 40 PPM (e.g., 40 ppm translates to 240 kHz CFO in 6 GHz). However, the same 40 PPM CFO in operations over the 60 GHz band may translate to approximately 2400 kHz CFO (e.g., approximately 10× greater CFO relative to the traditional bands). 2400 kHz CFO may not be acceptable for communication over 60 GHz due to path loss and other errors. Thus, in certain aspects, the CFO accuracy requirement of the transmitting and receiving devices may be tightened from 20 PPM to a relatively lower number. In some examples, the CFO accuracy requirement may be 1 PPM for Wi-Fi preamble and data communications over traditional bands and the 60 GHz band. By setting the same requirement for both the traditional and 60 GHz bands, hardware quantity is reduced. For example, the same local oscillator may be used for both traditional and 60 GHz bands. Thus, Wi-Fi standards may tighten the CFO requirement to ±1 PPM, or any other suitable number lower than ±20 PPM. It should be noted that the PPM requirement may be loosened to ±2 PPM or any other suitable number.

In certain aspects, the ±20 PPM requirement may be left unchanged. That is, the local oscillator of used by wireless devices for communication over the traditional bands may remain unchanged for communications over the 60 GHz band. For example, one or more of the preamble and/or data portion of the PPDU may be modified to prevent the higher CFO (e.g., the approximately 2400 kHz CFO) from negatively affecting communications over the 60 GHz band. In some examples, one or more of the preamble and the data portion may be upclocked to accommodate communications over the 60 GHz band.

In some examples, a PPDU structure transmitted via a traditional band may include a preamble defined by a 20 MHz waveform that may be duplicated a number of times (e.g., 16 times) so that that it spans the whole 320 MHz bandwidth. In other words, the portions of the preamble may be duplicated multiple times to fill the bandwidth.

In certain aspects, in order for a wireless device to reuse the hardware used for communication over the traditional bands in the 60 GHz band, the device may upclock the preamble by a factor. For example, by upclocking the preamble, the device may apply the same time domain samples for the preamble in the traditional bands in a preamble transmitted over the 60 GHz band and transmit the preamble faster by the factor instead of transmitting the preamble at the 20 MHz rate of the traditional bands. Accordingly, the preamble waveform may be compressed in the time domain and expanded in the frequency domain by the factor. In one example, if the preamble was upclocked by a factor of 16, then the preamble bandwidth may increase to 320 MHz, eliminating any need to duplicate the preamble. In certain aspects, the data portion of the 60 GHz band may also be upclocked by the same factor, thereby shrinking symbol durations of the data portion by the same factor. By upclocking the preamble, the preamble may be transmitted over a 60 GHz band without significant modification of legacy hardware (e.g., transmit and receive processors, local oscillators, transceivers and modulators/demodulators, and other hardware configured for communication over traditional bands). Upclocking may also reduce any deleterious effect that residual CFO may have on communications over the 60 GHz band.

As used herein, the term "non-legacy" may refer to operations or aspects that fall outside of the accepted 802.11 standards currently published and officially recognized as of the filing date of this disclosure. Thus, many if not all 802.11 capable wireless communication devices currently in operation may not be configured to communicate using the non-legacy aspects described herein.

FIG. 1 is a network schematic illustrating an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN network 100 also can include multiple APs 102 (e.g., multiple APs that are part of an AP multi-link device (MLD)).

Certain aspects of the disclosure may relate to multi-link (ML) communications between wireless MLDs. Each MLD may have a unique medium access control (MAC) address, which is also referred to as a MAC service access point (MAC-SAP) endpoint. One example of an MLD device is an AP MLD 102, which includes multiple APs each capable of communicating on multiple communication links and establishing a basic service set (BSS) on the multiple communication links. Another example of an MLD device is a STA MLD 104 (e.g., a non-AP MLD), which includes multiple STAs capable of communicating with other devices (such as an AP MLD 102) on multiple communication links. The STA MLD 104 may have one medium access control physical layer (MAC-PHY) instance for each of the multiple communication links, and the MAC address of each MAC-PHY instance may be the same or different.

Each of the STAs 104 also may be referred to as a mobile station (MS), a mobile device, a mobile handset, a wireless handset, an access terminal (AT), a user equipment (UE), a subscriber station (SS), a non-AP MLD, or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

Each of the frequency bands may include multiple sub-channels or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
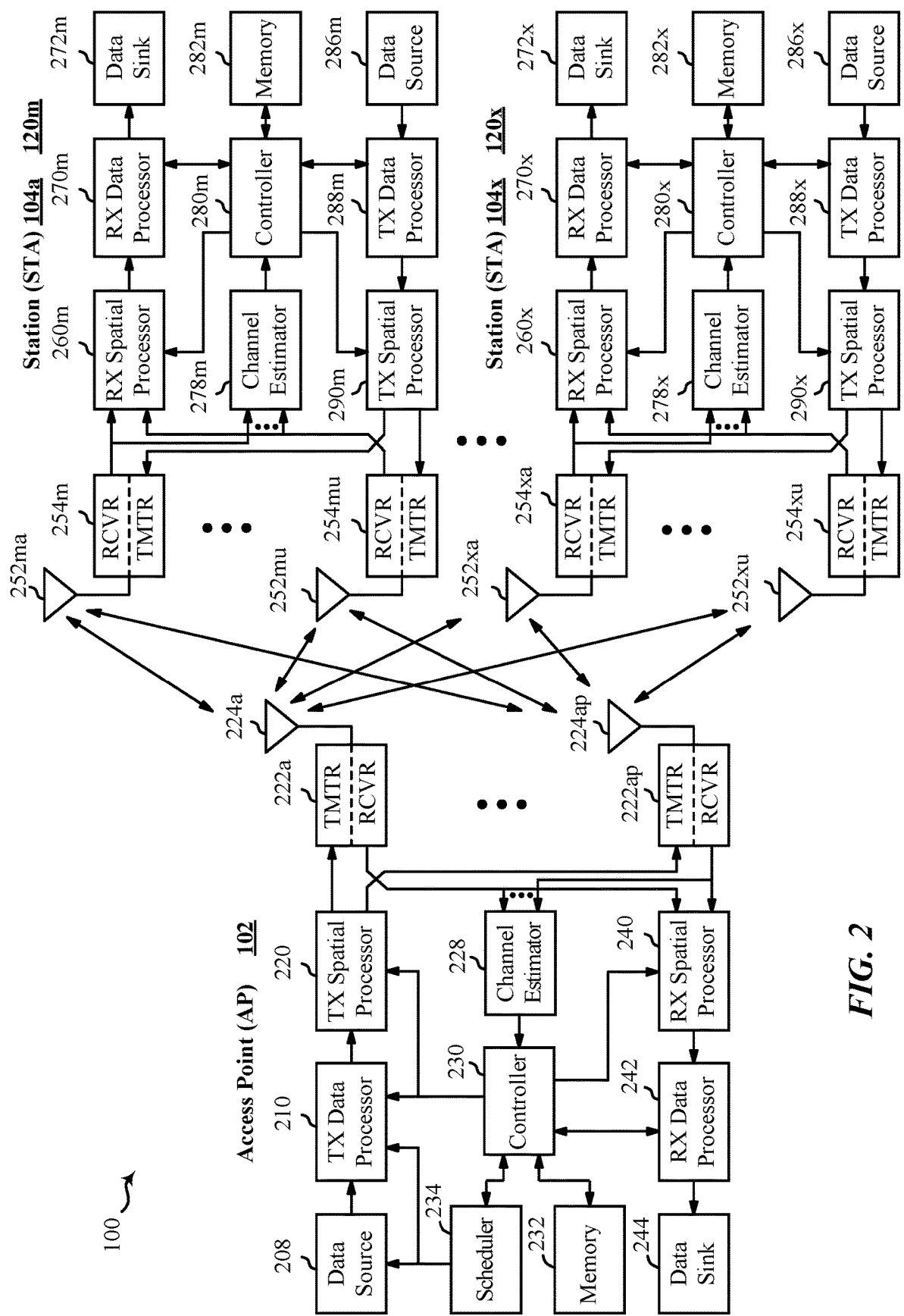
FIG. 2 is a diagram illustrating hardware aspects of an access point and two stations.

FIG. 2 illustrates a block diagram of an AP 102 and two STAs 104$a$ and 104$x$ in a BSS. The AP 102 is equipped with $N_t$ antennas 224$a$ through 224$t$. STA 120$m$ is equipped with $N_{ut,m}$ antennas 252$ma$ through 252$mu$, and STA 120$x$ is equipped with $N_{ut,x}$ antennas 252$xa$ through 252$xu$. The AP 102 is a transmitting entity for the downlink and a receiving entity for the uplink. Each STA 104 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up"

denotes the uplink, $N_{up}$ user terminals are selected for simultaneous transmission on the uplink, Nan user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each STA 104 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the AP 102.

N up STAs may be scheduled for simultaneous transmission on the uplink. Each of these STAs performs spatial processing on its data symbol stream and transmits its set of transmit symbol streams on the uplink to the AP 102.

At the AP 102, $N_{ap}$ antennas 224a through 224ap receive the uplink signals from all $N_{up}$ STAs transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at AP 102, a TX data processor 210 receives traffic data from a data source 208 for $N_{dn}$ STA scheduled for downlink transmission, control data from a controller 230, and possibly other data from a scheduler 234. The various types of data may be sent on different transport channels. TX data processor 210 processes (e.g., encodes, interleaves, and modulates) the traffic data for each STA based on the rate selected for that STA. TX data processor 210 provides $N_{dn}$ downlink data symbol streams for the $N_{dn}$ STA. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the STA.

At each STA 120, $N_{ut,m}$ antennas 252 receive the $N_{ap}$ downlink signals from AP 102. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the STA. The receiver spatial processing is performed in accordance with the CCMI, MMSE or some other technique. An RX data processor 270 processes (e.g., demodulates, deinterleaves and decodes) the recovered downlink data symbol stream to obtain decoded data for the STA.

At each STA 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each STA typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each STA may send feedback information (e.g., the downlink and/or uplink eigenvectors, eigenvalues, SNR estimates, and so on) to the access point. Controllers 230 and 280 also control the operation of various processing units at AP 102 and STA 104, respectively.

Example PPDU Structures

Figure 3:
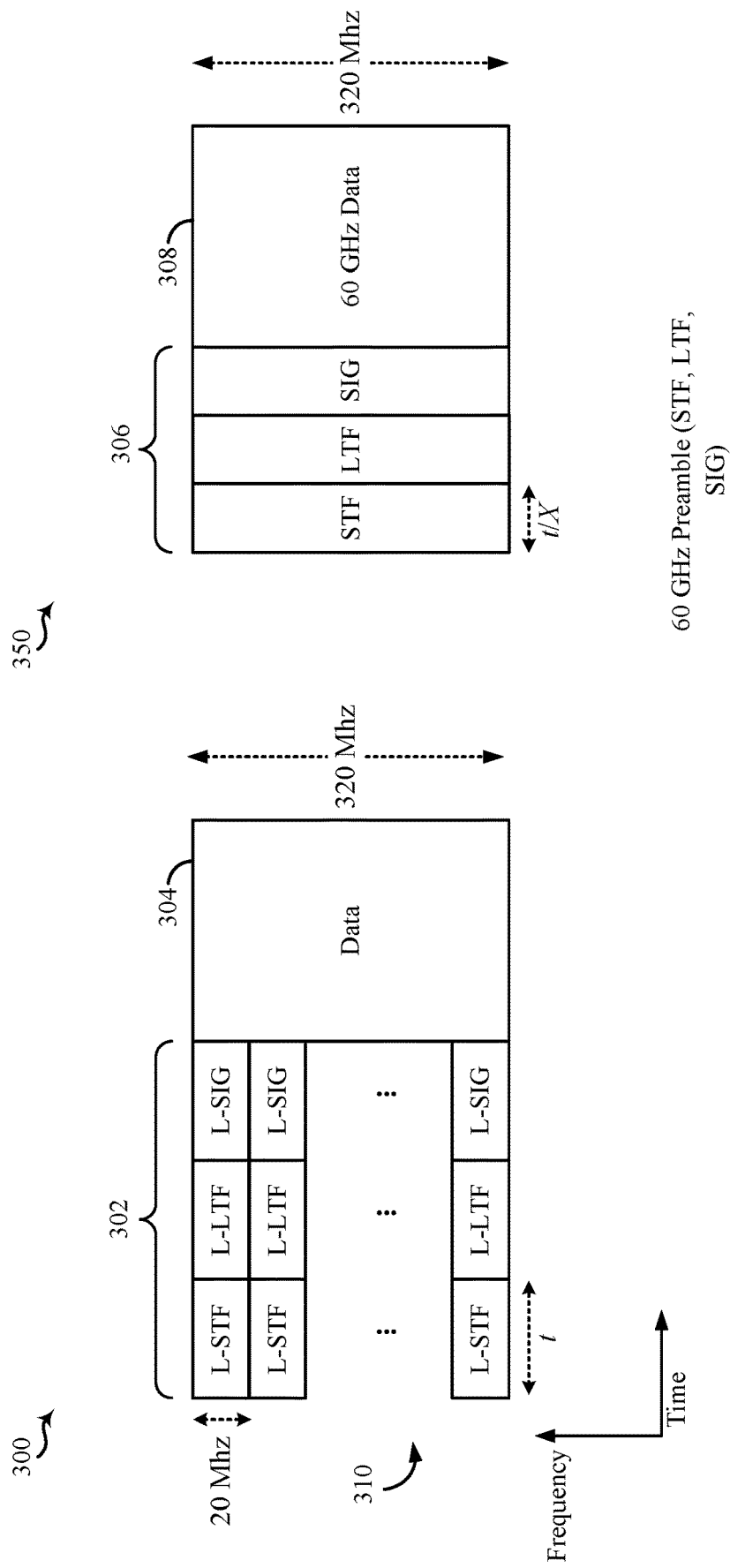
FIG. 3 is a bock diagram conceptually illustrating structures of an example sub-6 GHz physical layer protocol data unit (PPDU) and an example 60 GHz PPDU.

FIG. 3 is a bock diagram conceptually illustrating structures of an example sub-6 GHz physical layer protocol data unit (PPDU) and an example 60 GHz PPDU. As used herein, "sub-6 GHz" refers to the frequency of traditional bands (e.g., 2.4 GHz, 5 GHz, 6 GHz, etc.).

A first PPDU 300 structure shows an example of a PPDU structure for communications via a traditional band. The first PPDU 300 include a first preamble 302 portion that includes a plurality of chunks 310, wherein each chunk has a bandwidth of 20 MHz. The bandwidth of the entire PPDU may be 320 MHz. The first preamble 302 includes fixed sequences that allow for packet detection by a receiver, and also provide the receiver with a basis for determining a carrier frequency offset (CFO). For example, a receiver may utilize the first preamble 302 to determine whether the CFO of the first PPDU 300 is within a particular limit. Because each chunk is only 20 MHz, chunks in the same time domain may be duplicates of each other. For example, there may be 16 duplicates of each chunk in the same time domain.

For example, an initial set of chunks may be used for a plurality of legacy short training fields (L-STF) configured to carry a waveform using specified transmission parameters. Other chunks of the first preamble 302 may include fields, such as legacy long training fields (L-LTF) and legacy signal fields (L-SIG). A first data portion 304 may occupy the entire 320 MHz bandwidth.

A second PPDU 350 structure shows an example of a PPDU structure for communications via a 60 GHz band by a wireless device configured with legacy hardware (e.g., hardware configured for communication over traditional bands, such as 2.4 GHz, 5 GHz, and 6 GHz). The second PPDU may include a second preamble 306 portion and a second data portion 308 that use the full 320 MHz bandwidth. The second preamble 306 portion may use the same L-STF, L-LTF, and SIG fields as the first preamble 302 portion, but with a different waveform.

Examples of a Modified Clock Requirement

Referring to operation over the traditional bands, if there is CFO on both the transmitter and receiver sides, there is potential for an aggregated CFO to be as high as 40 PPM (e.g., 40 ppm translates to 240 kHz CFO in 6 GHz). However, the same 40 PPM CFO in operations over the 60 GHz band may translate to approximately 2400 kHz CFO (e.g., approximately 10× greater CFO relative to the traditional bands). 2400 kHz CFO may not be acceptable for communication over 60 GHz band due to path loss, interference with adjacent subcarriers, and other errors. Thus, in certain aspects, the CFO accuracy requirement of the transmitting and receiving devices may be tightened from 20 PPM to a relatively lower number.

In some examples, the CFO accuracy requirement may be 1-2 PPM for Wi-Fi preamble and data communications over traditional bands and the 60 GHz band. In such an example, the local oscillator of a wireless device may need to be modified or upgraded to support such a requirement. However, by using a local oscillator configured to support a 1-2 PPM CFO accuracy requirement, the wireless device may be used to communicate over both the traditional bands and 60 GHz bands. Thus, while a legacy clock requirement may be 20 PPM, the modified clock requirement may be lower, for example 1 PPM. In some examples, the legacy clock requirement is a requirement of at least one of 802.11ad, 802.11ax, 802.11 ay, or 802.11be.

Examples of Upclocked Communications

In certain aspects, the ±20 PPM legacy clock requirement may be left unchanged, thereby precluding modification or replacement of the local oscillator. That is, the local oscillator used by wireless devices for communication over the traditional bands may remain unchanged for communications over the 60 GHz band by the same wireless devices. For example, one or more of the preamble and/or data portion of the PPDU may be modified to prevent a relatively higher CFO (e.g., the approximately 2400 kHz CFO) associated the 60 GHz band from negatively affecting communications. In some examples, one or more of the preamble and the data portion may be modified by upclocking the transmitted signals to accommodate communications over the 60 GHz band.

As illustrated by the first PPDU 300 of FIG. 3, the conventional preamble fields use a fraction of the full 320 MHz bandwidth, so they may be duplicated to fill the 320 MHz bandwidth. Thus, the same preamble waveforms may be duplicated on multiple chunks 310 so that the preamble fields span 320 MHz. By upclocking the preamble fields by a factor (X), as shown in the second PPDU 350 of FIG. 3, the bandwidth of the preamble field is increased and the duration of the preamble field in the time domain of the field is decreased. For example, by upclocking the preamble fields by a factor of 16, the signals transmitted in these fields may occupy the full 320 MHz bandwidth and reduce the time domain of each preamble field by t/16. The following table 1 provides an example of preamble field parameters associated with legacy sub-6 GHz bands and the 60 GHz band with an upclock by a factor of 16 applied to communications over the 60 GHz band.

TABLE 1

| L-STF Parameters | Sub-6 GHz Band | 60 GHz Band |
| --- | --- | --- |
| L-STF bandwidth | 20 MHz | 320 MHZ |
| Subcarrier Spacing (δf) | 1.25 MHZ | 20 MHZ |
|  | (312.5 kHz × 4) | (312.5 kHz × 64) |
| Sample Rate ($f_s$) | $f_{s,6G}$ = 20 MHZ | $f_{s,60G}$ = 320 MHZ |
| L-STF Periodicity in Samples M | 16 | 16 |
|  | (0.8 μs × 20e6) | (0.05 μs × 320e6) |
| OFDM Symbol Duration N in Samples | 16 | 16 |
|  | (0.8 μs × 20e6) | (0.05 μs × 320e6) |
| Phase Estimation (φ) | $\Phi_{6G} = \frac{2\pi F_{6g} M}{N \delta f_{6G}}$ | $\Phi_{60G} = \frac{2\pi F_{60g} M}{N \delta f_{60G}} = \Phi_{6G}$ |
| Normalized CFO Estimate ($f_{norm}$) | $f_{norm,6G} = \frac{F_{6g}}{f_{s,6G}}$ | $f_{norm,60G} = f_{norm,6G}$ |
| Residual CFO Error | $\Delta F_{6g} = F_{6g} - f_{norm,6G} \, f_{s,6G}$ | $\Delta F_{60g} = 16 \times \Delta F_{6g}$ |

Here, $F_{6g}$ corresponds to a CFO in units of Hertz in the 6 GHz band, and $F_{60g}$ corresponds to a CFO in units of Hertz in the 60 GHz band. Thus, the transmitter may transmit preamble and/or data signals over the 60 GHz band using the same time domain sample periodicity used in a sub-6 GHz band, but upclock the signals by a factor of 16 to increase the 20 Mhz sample rate used in the sub-6 GHz band to a rate that is 16 times faster (e.g., 320 MHz). Thus, the waveform expands by a factor of 16 in the frequency domain and compresses by a factor of 16 in the time domain. It should be noted that the factor of 16 is an example, and any suitable factor may be used. For example, other factors of 8 through 16 may also work.

As shown in Table 1, upclocking a transmitted signal using a factor of 16 also increases the subcarrier spacing in the 60 GHz band relative to the sub-6 bands. Accordingly, because the subcarrier spacing in the 60 GHz band is increased, wireless devices communicating over the 60 GHz band can tolerate a higher CFO because subcarriers are spaced farther apart relative to the spacing in a sub-6 band. As such, the greater subcarrier spacing may reduce interference cause by residual CFO. As used herein, the CFO corresponds to an amount by which a local oscillator is off from the intended carrier frequency, and residual CFO corresponds to an amount by which the local oscillator is off from the intended carrier frequency after correcting the local oscillator. For example, a wireless device receiving either of the first preamble 302 or the second preamble 306 may measure and process the L-STF waveform(s), and use the measurements to correct the receivers local oscillator to reduce CFO. Error in the local oscillator may cause the transmitted signal to be outside of the intended carrier frequency.

Figure 4:
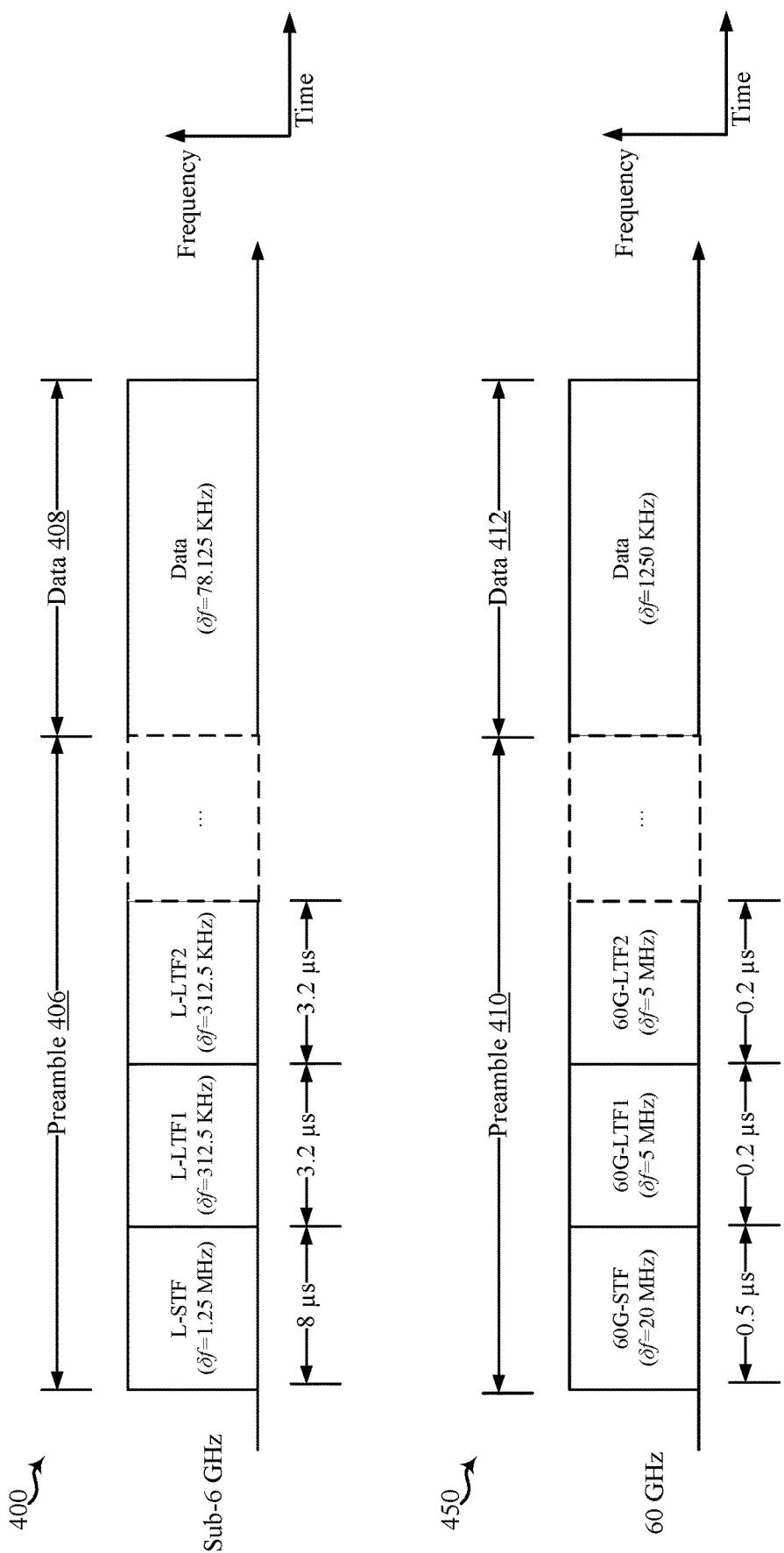
FIG. 4 is a diagram illustrating an example first PPDU transmitted via a sub-6 GHz band, and an example second PPDU transmitted via a 60 GHz band.

FIG. 4 is a diagram illustrating an example first PPDU 400 transmitted via a sub-6 GHz band, and an example second PPDU 450 transmitted via a 60 GHz band, wherein the signals transmitted in the preamble and data portions of the PPDU in the 60 GHz band are upclocked by a factor of 16. Here, both PPDUs may be transmitted by the same wireless device (e.g., an STA or AP) using legacy hardware. It should be noted that the PPDU structure and fields illustrated in FIG. 4 depict OFDM symbol durations without guard interval (GI) or cyclic prefix for brevity and to highlight the features of this disclosure.

The first PPDU 400 includes a first preamble 406 portion and a first data 408 portion and is transmitted via a sub-6 GHz band. Accordingly, the L-STF field has a duration of 8

µs, and the L-LTF1 and L-LTF2 fields have a duration of 3.2 µs. Data symbol duration in this example is 12.8 µs.

The second PPDU 450 transmitted via a 60 GHz band by a wireless device using legacy hardware (e.g., the same hardware as used for transmitting the first PPDU 400). The second PPDU 450 includes a second preamble 410 portion and a data 412 portion. Here, because all the fields of the second PPDU 450 are upclocked by a factor of 16, an L-STF field of the second preamble 410 has a duration of 0.5 µs, L-LTF1 and L-LTF2 portions have a preamble of 0.2 µs, and the data 412 portion has a data symbol duration of 0.8 µs. A wireless device may receive the second PPDU 450 by upclocking its receiving circuitry by the same factor used to upclock the transmitted second PPDU. Here, both the second preamble 410 portion ad the data 412 portion of the second PPDU 450 are upclocked relative to the first preamble 406 portion and a first data 408 of the first PPDU 400.

Figure 5:
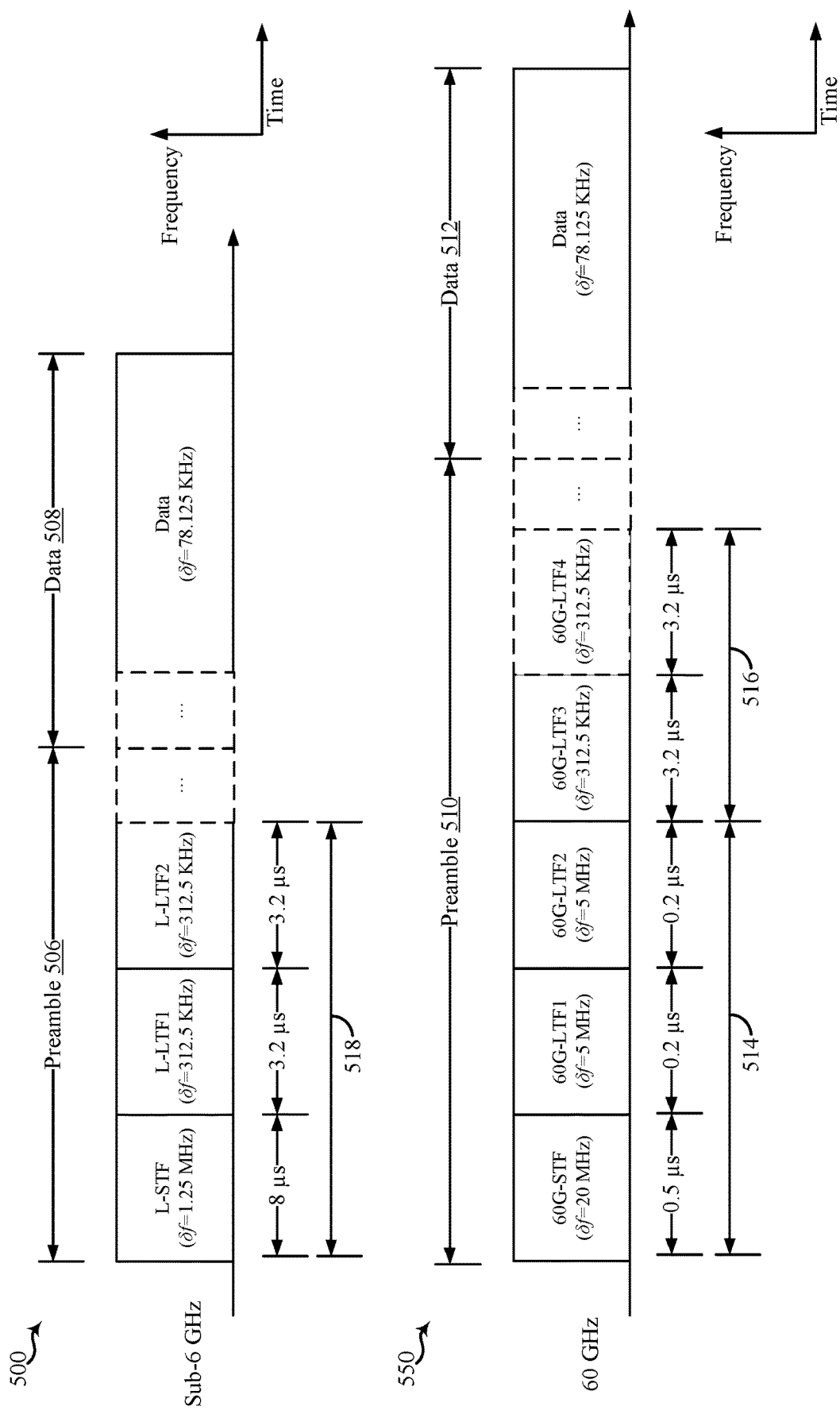
FIG. 5 is a diagram illustrating an example first PPDU transmitted via a sub-6 GHz band, and an example second PPDU transmitted via a 60 GHz band.

FIG. 5 is a diagram illustrating an example first PPDU 500 transmitted via a sub-6 GHz band, and an example second PPDU 550 transmitted via a 60 GHz band. The first PPDU 500 includes a first preamble 506 portion and a first data 508 portion, and the second PPDU 550 includes a second preamble 510 portion and a second data 512 portion.

It should be noted that the PPDU structure and fields illustrated in FIG. 5 depict OFDM symbol durations without guard interval (GI) or cyclic prefix for brevity and to highlight the features of this disclosure.

In this example, the signals transmitted in the first three fields 514 of the second preamble 510 portion of the second PPDU 550 in the 60 GHz band are upclocked by a factor of 16 relative to the first preamble 506 portion, the one or more L-LTF fields 516, and the signals transmitted in the second data 512 portion of the second PPDU 550500. That is, the first three fields 514 of the second PPDU 550 may be an upclocked version of the first three fields 518 of the first PPDU. Thus, the first three fields 514 of the second preamble 510 portion of the second PPDU 550 are upclocked versions of the first three fields of the first preamble 506 portion of the first PPDU 500, while the one or more L-LTF fields 516 and the second data 512 portion is not upclocked relative to the first data 508 portion.

By upclocking the first three fields 514 of the second preamble 510 portion of the second PPDU 550, any residual CFO associated with the first three fields 514 is increased relative to a residual CFO of any of the fields in the first preamble 506 portion of the first PPDU 500 in the sub-6 band. For example, if the residual CFO of the first preamble 506 portion is 2 kHz, upclocking at the first three fields 514 would make the residual CFO of the first three fields 514 relatively higher (e.g., ~20 kHz). However, due to the greater subcarrier spacing associated with the upclocked the first three fields 514 relative to any of the fields of the first preamble 506, the relatively higher residual CFO may be tolerated without reducing the quality of communications.

However, because the second data 512 portion of the second PPDU 550 of FIG. 5 is not upclocked relative to the first data 508 portion, the wireless device transmitting the second PPDU 550 may ensure that, at the end of the second preamble 510 portion, the amount of residual CFO at the beginning of the second data 512 portion is substantially the same as the residual CFO that would occur at the beginning of the first data 508 portion of the first PPDU 500.

Accordingly, in certain aspects, an additional one or more L-LTF fields 516 may be added to the second preamble 510 portion of the second PPDU 550 to provide the wireless device receiving the second PPDU 550 an opportunity to measure CFO and reduce residual CFO based on the additional one or more L-LTF fields 516 so that the residual CFO of the second data 512 portion is substantially the same as what the residual CFO would be at the first data 508 portion. In other words, the additional one or more L-LTF fields 516 may allow the wireless device receiving the second PPDU 550 to bring down the residual CFO of the upclocked first three fields 514 of the second preamble 510 portion to a level of residual CFO expected at the first data 508 portion of the first PPDU 500.

Thus, in some examples, the first three fields 518 of the first PPDU may be upclocked by a factor (e.g., 10-16), resulting in the first three fields of the second PPDU 550. That is, first three fields 518 of the first PPDU may be the same first three fields of the second PPDU 550. However, in order to not upclock the second data 512 portion (as with the example shown in connection with FIG. 4), the additional one or more L-LTF fields 516 may be added to the second preamble 510 portion. Here, the additional one or more L-LTF fields 516 may be the same as the L-LTF fields of the first three fields 518 of the first PPDU (e.g., same waveform and both have 312.5 kHz subcarrier spacing), but instead of spanning 20 MHz of bandwidth, the additional one or more L-LTF fields 516 may span 320 MHz of bandwidth. The wireless device receiving the second PPDU 550 may use the additional one or more L-LTF fields 516 to reduce its residual CFO to substantially match the residual CFO that would be expected of the receiving device in the first PPDU 500. Thus, when the wireless device receives the second data 512 portion of the second PPDU that is not upclocked relative to the first data 508 portion, any residual CFO at the receiving device does not negatively affect the receiving device's ability to receive the second data 512.

Thus, the above examples in connection with FIGS. 3-5 describe communication features that will allow wireless devices (e.g., STA and AP) to reuse sub-6 band physical (PHY) communication techniques in 60 GHz band communications. For example, communication over a 60 GHz band may reuse sub-6 band OFDM PHY techniques (e.g., sub-6 modulation coding scheme (MCS)) and legacy hardware and baseband processing. Accordingly, 60 GHz band communication may be achieved without substantial redesign of the wireless device.

Figure 6:
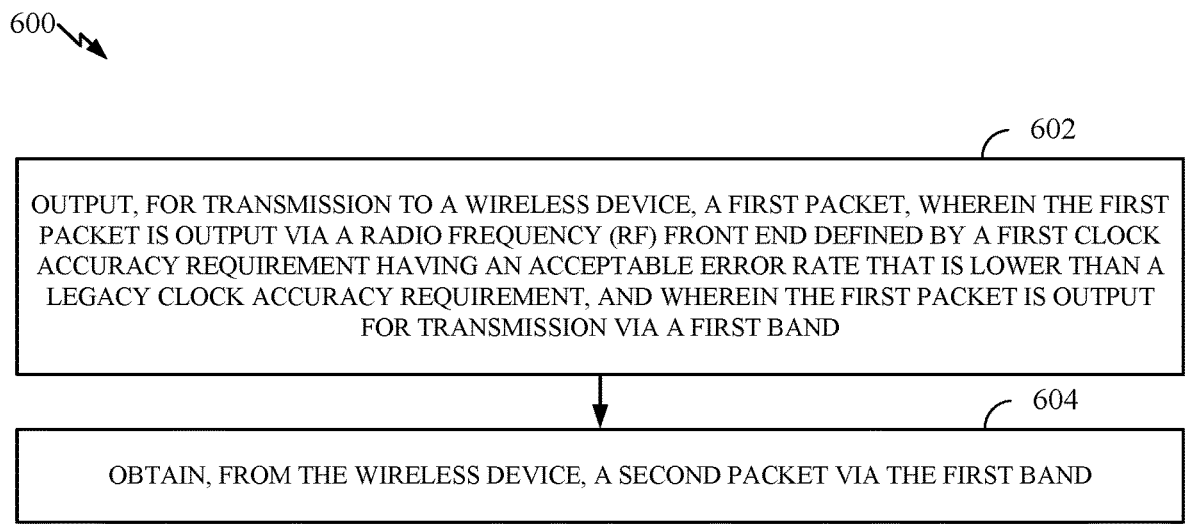
FIG. 6 is a flow diagram illustrating example operations for wireless communication, in accordance with certain aspects of the present disclosure.

FIG. 6 is a flowchart 600 of a method of wireless communication. The method may be performed by an apparatus (e.g., STA 104 and/or AP 102 of FIG. 1; the apparatus 700 of FIG. 7). The method may be implemented as software components that are executed and run on one or more processors (e.g., controller 230 of the AP or controller 280 of the STA in FIG. 2). Further, the transmission and reception of signals by the AP and STA may be enabled, for example, by one or more antennas (e.g., antennas 224/252 of FIG. 2). In certain aspects, the transmission and/or reception of signals by the AP and STA may be implemented via a bus interface of one or more processors (e.g., controller 230/280) obtaining and/or outputting signals.

At 602, the apparatus may output, for transmission to a wireless device, a first packet, wherein the first packet is output via a radio frequency (RF) front end defined by a first clock accuracy requirement having an acceptable error rate that is lower than a legacy clock accuracy requirement, and wherein the first packet is output for transmission via a first band. For example, the apparatus may be configured with RF front end hardware that includes a local oscillator. Legacy requirements may provide an accuracy requirement of the local oscillator, meaning that the local oscillator needs to be able to enable transmission of a signal within an intended bandwidth with no more than a particular amount of CFO error (e.g., no more than 20 PPM). Here, the local oscillator may be improved so that it has a stricter requirement (e.g., no more than 2 PPM). Thus, relative to a local oscillator that uses a legacy accuracy requirement, the improved local oscillator may be configured to have much less CFO error, if any. Moreover, when a signal is transmitted over a 60 GHz band, any CFO error will be much greater in amplitude relative to CFO error if the same signal is transmitted over a sub-6 band. Thus, the more stringent accuracy requirement may reduce CFO in transmissions over the first band (e.g., 60 GHz band).

At 904, the apparatus may be configured to obtain, from the wireless device, a second packet via the first band. That is, the apparatus may receive signals transmitted over the 60 GHz band, wherein those signals are transmitted by a wireless device using the same improved local oscillator.

In certain aspects, the first band is a 60 gigahertz frequency band.

In certain aspects, the legacy clock requirement is substantially ±20 parts-per-million (PPM), and wherein the first clock accuracy requirement is substantially ±1 PPM.

In certain aspects, the legacy clock requirement is a requirement of at least one of Institute of Electrical and Electronics Engineers (IEEE) 802.11ad, 802.11ax, 802.11ay, or 802.11be.

In certain aspects, the first packet is output for transmission via an orthogonal frequency division multiplex (OFDM) physical layer (PHY) of at least one of Institute of Electrical and Electronics Engineers (IEEE) 802.11ad, 802.11ax, 802.11ay, or 802.11be.

Figure 7:
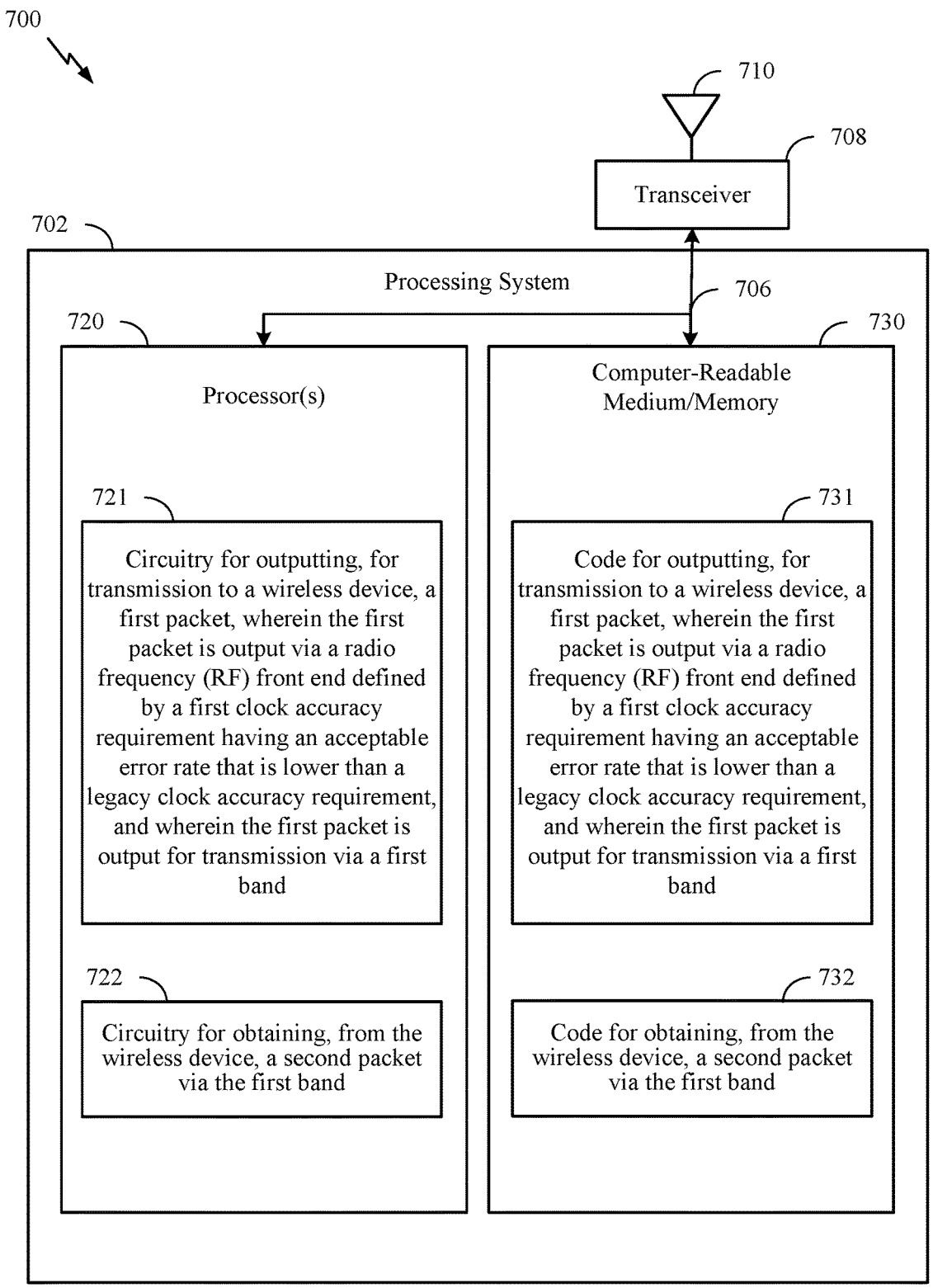
FIG. 7 depicts an example apparatus configured for wireless communication.

FIG. 7 depicts an example apparatus 700 configured for wireless communication that includes various components operable, configured, or adapted to perform operations for the techniques disclosed herein, such as the operations depicted and described with respect to FIG. 6. In some examples, the apparatus 700 may be an AP 102 or an STA 104 as described, for example with respect to FIGS. 1 and 2.

The apparatus 700 includes a processing system 702 coupled to a transceiver 708 (e.g., a transmitter and/or a receiver). Transceiver 708 is configured to transmit (or send) and receive signals for the apparatus 700 via an antenna 710, such as the various signals as described herein. Processing system 702 may be configured to perform processing functions for the apparatus 700, including processing signals received and/or to be transmitted by the apparatus 700.

Processing system 702 includes one or more processors 720 coupled to a computer-readable medium/memory 730 via a bus 706. In certain aspects, computer-readable medium/memory 730 is configured to store instructions (e.g., computer-executable code) that when executed by the one or more processors 720, cause the one or more processors 720 to perform the operations illustrated in FIG. 6, or other operations for performing the various techniques discussed herein.

In the depicted example, computer-readable medium/memory 730 stores code 731 for outputting, for transmission to a wireless device, a first packet, wherein the first packet is output via a radio frequency (RF) front end defined by a first clock accuracy requirement having an acceptable error rate that is lower than a legacy clock accuracy requirement, and wherein the first packet is output for transmission via a first band; and code 732 for obtaining, from the wireless device, a second packet via the first band.

In the depicted example, the one or more processors 720 include circuitry configured to implement the code stored in the computer-readable medium/memory 730, including circuitry 721 for outputting, for transmission to a wireless device, a first packet, wherein the first packet is output via a radio frequency (RF) front end defined by a first clock accuracy requirement having an acceptable error rate that is lower than a legacy clock accuracy requirement, and wherein the first packet is output for transmission via a first band; and circuitry 722 for obtaining, from the wireless device, a second packet via the first band.

Various components of the apparatus 700 may provide means for performing the methods described herein, including with respect to FIG. 6. In some examples, means for transmitting, outputting, sending (or means for outputting for transmission), receiving, and/or obtaining may include the transceivers 222/254 and/or antenna(s) 224/252 of the AP 102 and STA 104 illustrated in FIG. 2 and/or transceiver 708 and antenna 710 of the apparatus 700 in FIG. 7. For example, these various components may provide a means for outputting, for transmission to a wireless device, a first packet, wherein the first packet is output via a radio frequency (RF) front end defined by a first clock accuracy requirement having an acceptable error rate that is lower than a legacy clock accuracy requirement, and wherein the first packet is output for transmission via a first band. In another example, these various components may provide for means for obtaining, from the wireless device, a second packet via the first band.

Figure 8:
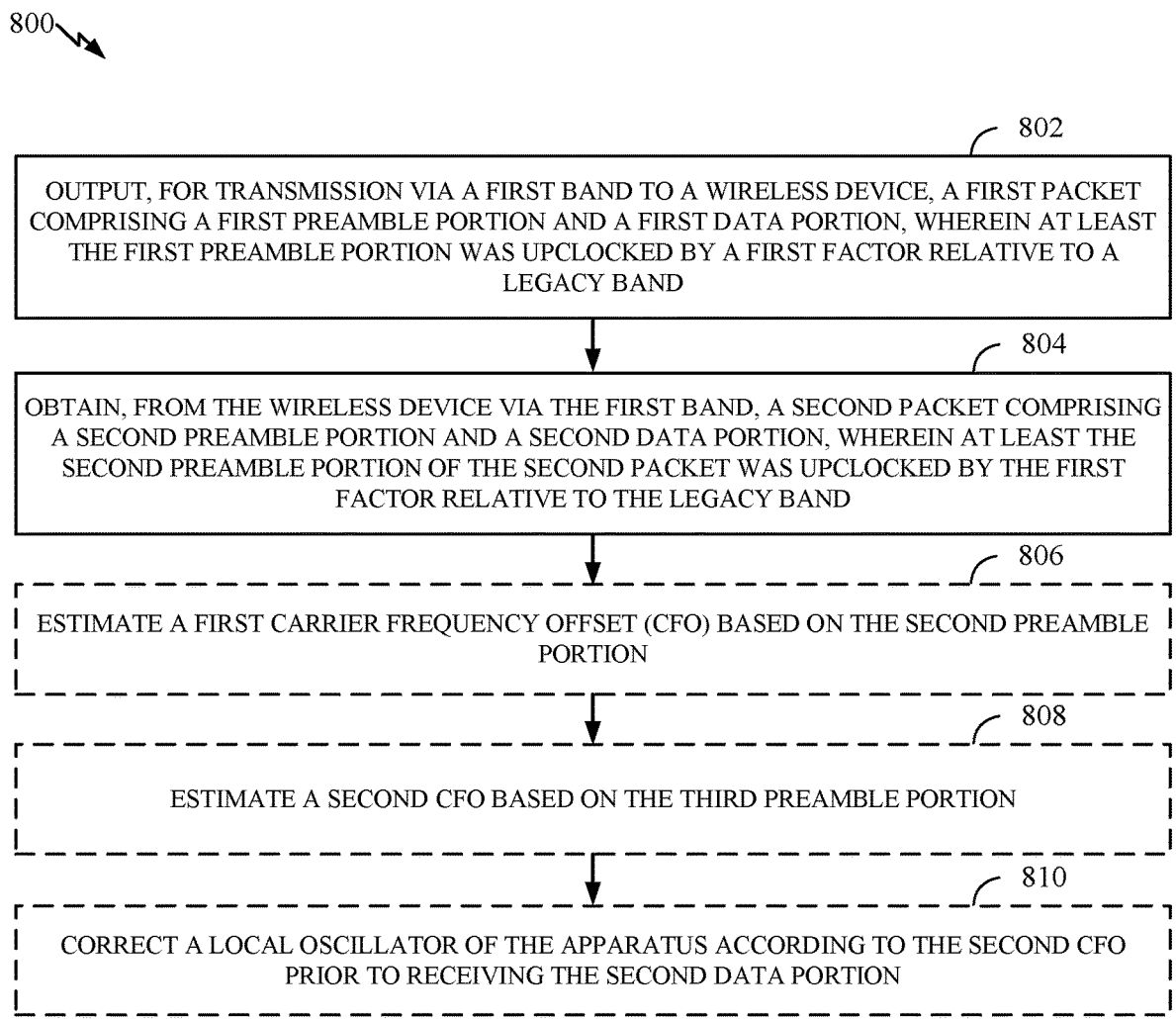
FIG. 8 is a flow diagram illustrating example operations for wireless communication, in accordance with certain aspects of the present disclosure.

FIG. 8 is a flow diagram illustrating example operations 800 for wireless communication, in accordance with certain aspects of the present disclosure. The operations 800 may be performed, for example, by an apparatus (e.g., AP 102 and/or STA 104 of FIGS. 1 and 2). The operations 800 may be implemented as software components that are executed and run on one or more processors (e.g., controller 230/280 of FIG. 2). Further, the transmission and reception of signals by the AP and/or STA in operations 800 may be enabled, for example, by one or more antennas (e.g., antennas 224/252 of FIGS. 1 and 2). In certain aspects, the transmission and/or reception of signals by the AP and/or STA may be implemented via a bus interface of one or more processors (e.g., controller 230/280) obtaining and/or outputting signals.

The operations 800 begin, at a first block 802, by outputting, for transmission via a first band to a wireless device, a first packet comprising a first preamble portion and a first data portion, wherein at least the first preamble portion was upclocked by a first factor relative to a legacy band. Here, the apparatus may transmit the first packet via a 60 GHz band, and upclock one or more signals of the first packet relative to a clocking speed of a sub-6 band. Specifically, the apparatus may upclock a preamble field of the first packet, but not upclock a data field of the first packet.

The operations 800 may proceed, at a second block 804, by obtaining, from the wireless device via the first band, a second packet comprising a second preamble portion and a second data portion, wherein at least the second preamble portion of the second packet was upclocked by the first factor relative to the legacy band. Here, the apparatus may receive a packet similar to the first packet described above. Both the first packet and the second packet may be configured to be transmitted over a 60 GHz band by devices without significantly changing the hardware of the devices.

The operations 800 may optionally proceed, at a third block 806, by estimating a first carrier frequency offset (CFO) based on the second preamble portion. Here, the apparatus may measure a CFO and perform processing to correct any estimated CFO. For example, the apparatus may use signaling in an L-STF and L-LTF fields of the second preamble portion to make the estimate.

The operations 800 may optionally proceed, at a fourth block 808, by estimating a second CFO based on the third preamble portion, wherein the third preamble portion is adjacent to the second preamble portion. In some examples, the third preamble portion is an additional one or more L-LTF fields, but instead of spanning 20 MHz bandwidth as in the sub-6 band, the additional one or more L-LTF fields may span 320 MHz bandwidth. The apparatus may receive the third preamble portion and use the additional one or more L-LTF fields to reduce its residual CFO to substantially match the residual CFO that would be expected of the receiving device in a sub-6 band. Thus, when the wireless device receives a data portion of the second packet that is not upclocked relative to the second preamble portion, any residual CFO at apparatus does not negatively affect the apparatus's ability to receive the data.

The operations 800 may optionally proceed, at a fifth block 810, by correcting a local oscillator of the apparatus according to the second CFO prior to receiving the second data portion.

In certain aspects, the first factor comprises a factor of 10, 12, or 16.

In certain aspects, the data portion is output for transmission via one of: (i) the legacy band, or (ii) the first band upclocked relative to the legacy band by the first factor.

In certain aspects, the first band is a 60 gigahertz frequency band, and wherein the legacy band is one of a 2.4 gigahertz frequency band, a 5 gigahertz frequency band, or a 6 gigahertz frequency band.

In certain aspects, the second packet further comprises a third preamble portion, the third preamble portion is clocked according to the legacy band, and the data portion is clocked according to the legacy band.

In certain aspects, both the second preamble portion and the third preamble portion are output for transmission with a first bandwidth. That is, both the second preamble portion and the third preamble portion have the same bandwidth (e.g., the first bandwidth). In some examples, the first bandwidth is substantially equal to the bandwidth of the 60 GHz band.

In certain aspects, the first packet is output for transmission via an orthogonal frequency division multiplex (OFDM) physical layer (PHY) of at least one of IEEE 802.11ad, 802.11ax, 802.11ay, or 802.11be.

In certain aspects, the first preamble portion is output for transmission with a bandwidth greater than 20 MHz.

Figure 9:
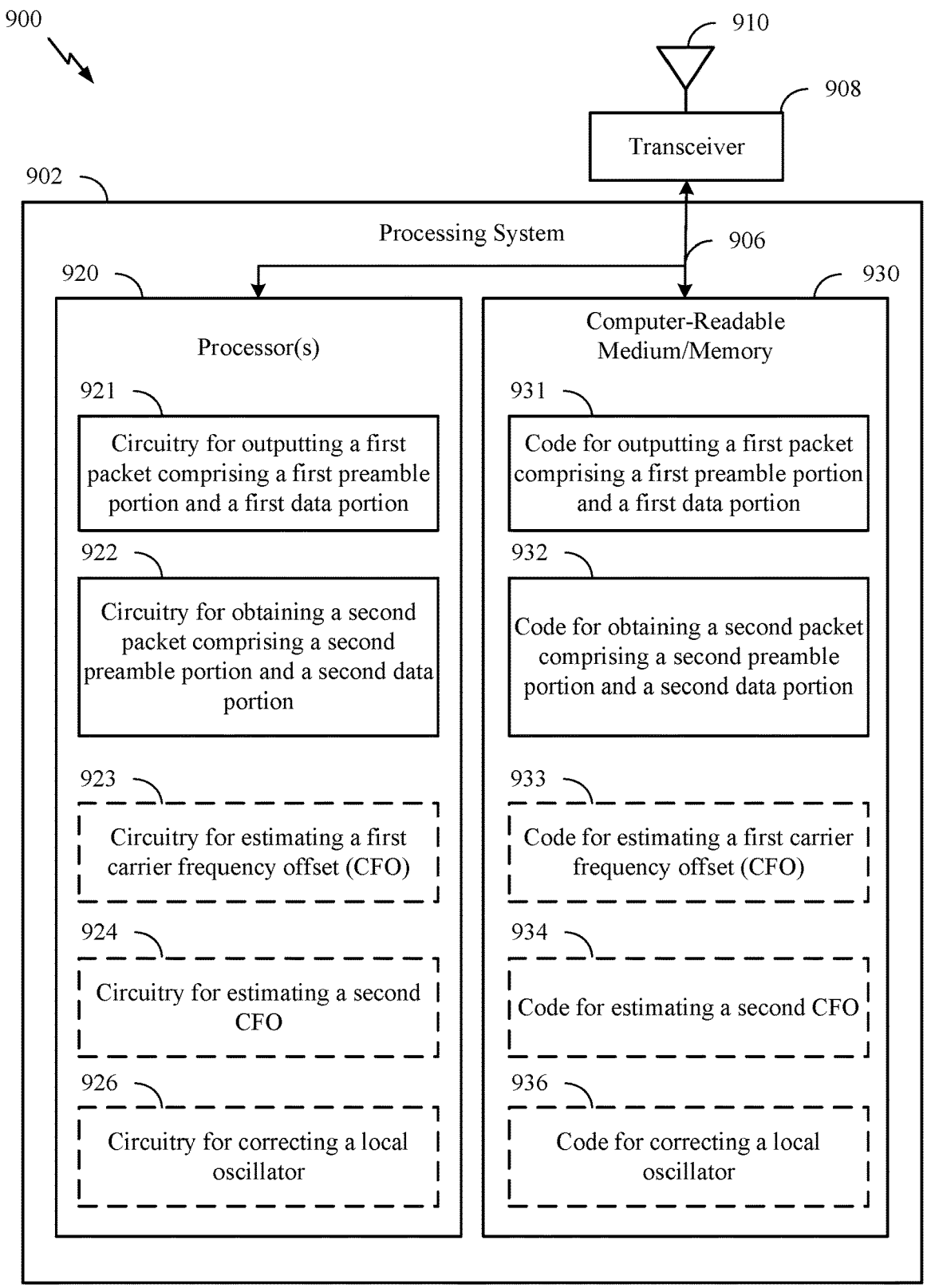
FIG. 9 depicts an example apparatus configured for wireless communication.

FIG. 9 depicts an example apparatus 900 that includes various components operable, configured, or adapted to perform operations for the techniques disclosed herein, such as the operations depicted and described with respect to FIG. 8. In some examples, the apparatus 900 may be an AP 102 and/or an STA 104 as described, for example with respect to FIGS. 1 and 2.

The apparatus 900 includes a processing system 902 coupled to a transceiver 908 (e.g., a transmitter and/or a receiver). Transceiver 908 is configured to transmit (or send) and receive signals for the apparatus 900 via an antenna 910, such as the various signals as described herein. Processing system 902 may be configured to perform processing functions for the apparatus 900, including processing signals received and/or to be transmitted by the apparatus 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIG. 8, or other operations for performing the various techniques discussed herein.

In the depicted example, computer-readable medium/memory 930 stores code 931 for outputting, for transmission via a first band to a wireless device, a first packet comprising a first preamble portion and a first data portion, wherein at least the first preamble portion was upclocked by a first factor relative to a legacy band; code 932 for obtaining, from the wireless device via the first band, a second packet comprising a second preamble portion and a second data portion, wherein at least the second preamble portion of the second packet was upclocked by the first factor relative to the legacy band; code 933 for estimating a first carrier frequency offset (CFO) based on the second preamble portion; code 934 for estimating a second CFO based on the third preamble portion, wherein the third preamble portion is adjacent to the second preamble portion; and code 936 for correcting a local oscillator of the apparatus according to the second CFO prior to receiving the second data portion.

In the depicted example, the one or more processors 920 include circuitry configured to implement the code stored in the computer-readable medium/memory 930, including circuitry 921 for outputting, for transmission via a first band to a wireless device, a first packet comprising a first preamble portion and a first data portion, wherein at least the first preamble portion was upclocked by a first factor relative to a legacy band; circuitry 922 for obtaining, from the wireless device via the first band, a second packet comprising a second preamble portion and a second data portion, wherein at least the second preamble portion of the second packet was upclocked by the first factor relative to the legacy band; circuitry 923 for estimating a first carrier frequency offset (CFO) based on the second preamble portion; circuitry 924 for estimating a second CFO based on the third preamble portion, wherein the third preamble portion is adjacent to the second preamble portion; and circuitry 926 for correcting a local oscillator of the apparatus according to the second CFO prior to receiving the second data portion.

Various components of the apparatus 900 may provide means for performing the methods described herein, including with respect to FIG. 8. In some examples, means for receiving and transmitting (or means for obtaining and outputting for transmission) may include the transceivers 254/222 and/or antenna(s) 252/224 of the STA or AP illustrated in FIG. 2 and/or transceiver 908 and antenna 910 of the apparatus 900 in FIG. 9. Means for estimating and means for correcting may include the controller 280/230, memory 282/232, and other various processors of FIG. 2 and/or the processor(s) 920 and computer-readable medium 930 of FIG. 9. For example, the various components may include a means for output, for transmission via a first band to a wireless device, a first packet comprising a first preamble portion and a first data portion, wherein at least the first preamble portion was upclocked by a first factor relative to a legacy band. The various components may also include a means for obtaining, from the wireless device via the first band, a second packet comprising a second preamble portion and a second data portion, wherein at least the second preamble portion of the second packet was upclocked by the first factor relative to the legacy band. The various components may also include: (i) means for estimating a first carrier frequency offset (CFO) based on the second preamble portion; (ii) means for estimating a second CFO based on the third preamble portion, wherein the third preamble portion is adjacent to the second preamble portion; and (iii)

means for correcting a local oscillator of the apparatus according to the second CFO prior to receiving the second data portion.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2. Notably, FIG. 9 is an example, and many other examples and configurations of the apparatus 900 are possible.

Example Aspects

Example 1 is a method for wireless communication by a first wireless device, comprising: outputting, for transmission to a second wireless device, a first packet, wherein the first packet is output via a radio frequency (RF) front end defined by a first clock accuracy requirement having an acceptable error rate that is lower than a legacy clock accuracy requirement, and wherein the first packet is output for transmission via a first band; and obtaining, from the second wireless device, a second packet via the first band.

Example 2 is the method of example 1, wherein the first band is a 60 gigahertz frequency band.

Example 3 is the method of any of examples 1 and 2, wherein the legacy clock accuracy requirement is substantially ±20 parts-per-million (PPM), and wherein the first clock accuracy requirement is substantially ±1 PPM.

Example 4 is the method of any of examples 1-3, wherein the legacy clock accuracy requirement is a requirement of at least one of Institute of Electrical and Electronics Engineers (IEEE) 802.11ad, 802.11ax, 802.11ay, or 802.11be.

Example 5 is the method of any of examples 1-4, wherein the first packet is output for transmission via an orthogonal frequency division multiplex (OFDM) physical layer (PHY) of at least one of Institute of Electrical and Electronics Engineers (IEEE) 802.11ad, 802.11ax, 802.11ay, or 802.11be.

Example 6 is a method for wireless communication by a first wireless device, comprising: outputting, for transmission via a first band to a wireless device, a first packet comprising a first preamble portion and a first data portion, wherein at least the first preamble portion was upclocked by a first factor relative to a legacy band; and obtaining, from the wireless device via the first band, a second packet comprising a second preamble portion and a second data portion, wherein at least the second preamble portion of the second packet was upclocked by the first factor relative to the legacy band.

Example 7 is the method of example 6, wherein the first factor comprises a factor of 10, 12, or 16.

Example 8 is the method of any of examples 6 and 7, wherein the first data portion is output for transmission via one of: (i) the legacy band, or (ii) the first band upclocked relative to the legacy band by the first factor.

Example 9 is the method of any of examples 6-8, wherein the first band is a 60 gigahertz frequency band, and wherein the legacy band is one of a 2.4 gigahertz frequency band, a 5 gigahertz frequency band, or a 6 gigahertz frequency band.

Example 10 is the method of any of examples 6-9, wherein: the second packet further comprises a third preamble portion, the third preamble portion is clocked according to the legacy band, and the second data portion is clocked according to the legacy band.

Example 11 is the method of any of examples 6-10, wherein the method further comprises: estimating a first carrier frequency offset (CFO) based on the second preamble portion; estimating a second CFO based on the third preamble portion; and correcting a local oscillator of the first wireless device according to the second CFO prior to receiving the second data portion.

Example 12 is the method of example 11, wherein the third preamble portion is adjacent to the second preamble portion.

Example 13 is the method of any of examples 6-12, wherein the first packet is output for transmission via an orthogonal frequency division multiplex (OFDM) physical layer (PHY) of at least one of Institute of Electrical and Electronics Engineers (IEEE) 802.11ad, 802.11ax, 802.11ay, or 802.11be.

Example 14 is the method of any of examples 6-13, wherein the first preamble portion is output for transmission with a bandwidth greater than 20 MHz.

Example 15 is a first wireless device, comprising: a transceiver; a memory comprising instructions; and one or more processors configured to execute the instructions to cause the first wireless device to perform a method in accordance with any one of examples 1-5, wherein the transceiver is configured to: transmit the first packet; and receive the second packet.

Example 16 is a first wireless device, comprising: a transceiver; a memory comprising instructions; and one or more processors configured to execute the instructions and cause the network node to perform a method in accordance with any one of examples 6-14, wherein the transceiver is configured to: transmit the first packet; and receive the second packet.

Example 17 is an apparatus for wireless communications, comprising means for performing a method in accordance with any one of examples 1-5.

Example 18 is an apparatus for wireless communications, comprising means for performing a method in accordance with any one of examples 6-14.

Example 19 is a non-transitory computer-readable medium comprising instructions that, when executed by an apparatus, cause the apparatus to perform a method in accordance with any one of examples 1-5.

Example 20 is a non-transitory computer-readable medium comprising instructions that, when executed by an apparatus, cause the apparatus to perform a method in accordance with any one of examples 6-14.

Example 21 is an apparatus for wireless communications, comprising: a memory comprising instructions; and one or more processors configured to execute the instructions to cause the apparatus to perform a method in accordance with any one of examples 1-5.

Example 22 is apparatus for wireless communications, comprising: a memory comprising instructions; and one or more processors configured to execute the instructions to cause the apparatus to perform a method in accordance with any one of examples 6-14.

ADDITIONAL CONSIDERATIONS

The preceding description provides examples of techniques for increasing local area network (LAN) device privacy in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus configured for wireless communication, comprising:
   one or more memories comprising instructions; and
   one or more processors configured to execute the instructions and cause the apparatus to:
      output, for transmission to a wireless device, a first packet, wherein the first packet is output via a radio frequency (RF) front end defined by a first clock accuracy having a configured error rate that is lower than a legacy clock accuracy, and wherein the first packet is output for transmission via a first band; and
      obtain, from the wireless device, a second packet via the first band.

2. The apparatus of claim 1, wherein the first band is a 60 gigahertz frequency band.

3. The apparatus of claim 1, wherein a legacy clock accuracy requirement is ±20 parts-per-million (PPM), and wherein a first clock accuracy requirement is ±1 PPM.

4. The apparatus of claim 1, wherein a legacy clock accuracy requirement is a requirement of at least one of Institute of Electrical and Electronics Engineers (IEEE) 802.11ad, 802.11ax, 802.11ay, or 802.11be.

5. The apparatus of claim 1, wherein the first packet is output for transmission via an orthogonal frequency division multiplex (OFDM) physical layer (PHY) of at least one of Institute of Electrical and Electronics Engineers (IEEE) 802.11ad, 802.11ax, 802.11ay, or 802.11be.

6. An apparatus for wireless communication, comprising:
   one or more memories comprising instructions; and
   one or more processors configured to execute the instructions and cause the apparatus to:
      transmit a first packet to a second wireless device, wherein the first packet is transmitted via a radio frequency (RF) front end defined by a first clock accuracy having a configured error rate that is lower than a legacy clock accuracy, and wherein the first packet is transmitted via a first band; and
      receive via the first band, a second packet from the second wireless device.

7. The apparatus of claim 6, wherein the first band is a 60 gigahertz frequency band.

8. The apparatus of claim 6, wherein a legacy clock accuracy requirement is ±20 parts-per-million (PPM), and wherein a first clock accuracy requirement is ±1 PPM.

9. The apparatus of claim 6, wherein a legacy clock accuracy requirement is a requirement of at least one of Institute of Electrical and Electronics Engineers (IEEE) 802.11ad, 802.11ax, 802.11ay, or 802.11be.

10. The apparatus of claim 6, wherein the first packet is transmitted via an orthogonal frequency division multiplex (OFDM) physical layer (PHY) of at least one of Institute of Electrical and Electronics Engineers (IEEE) 802.11ad, 802.11ax, 802.11ay, or 802.11be.

11. A method for wireless communication at a first wireless device, comprising:
   output, for transmission to a second wireless device, a first packet, wherein the first packet is output via a radio frequency (RF) front end defined by a first clock accuracy having a configured error rate that is lower than a legacy clock accuracy, and wherein the first packet is output for transmission via a first band; and
   obtain, from the second wireless device, a second packet via the first band.

12. The method of claim 11, wherein the first band is a 60 gigahertz frequency band.

13. The method of claim 11, wherein a legacy clock accuracy requirement is ±20 parts-per-million (PPM), and wherein a first clock accuracy requirement is ±1 PPM.

14. The method of claim 11, wherein a legacy clock accuracy requirement is a requirement of at least one of Institute of Electrical and Electronics Engineers (IEEE) 802.11ad, 802.11ax, 802.11ay, or 802.11be.

15. The method of claim 11, wherein the first packet is output for transmission via an orthogonal frequency division multiplex (OFDM) physical layer (PHY) of at least one of Institute of Electrical and Electronics Engineers (IEEE) 802.11ad, 802.11ax, 802.11ay, or 802.11be.

* * * * *